United States Patent
Takeo

(10) Patent No.: US 9,290,904 B2
(45) Date of Patent: Mar. 22, 2016

(54) SHOVEL AND METHOD OF CONTROLLING SHOVEL

(71) Applicant: SUMITOMO(S.H.I.) CONSTRUCTION MACHINERY CO., LTD., Tokyo (JP)

(72) Inventor: Jitsutaka Takeo, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 159 days.

(21) Appl. No.: 14/160,686

(22) Filed: Jan. 22, 2014

(65) Prior Publication Data

US 2014/0229078 A1 Aug. 14, 2014

(30) Foreign Application Priority Data

Feb. 8, 2013 (JP) ................................ 2013-023620

(51) Int. Cl.
| | |
|---|---|
| H02J 7/00 | (2006.01) |
| E02F 3/30 | (2006.01) |
| B60L 11/18 | (2006.01) |
| E02F 9/20 | (2006.01) |
| E02F 9/26 | (2006.01) |

(Continued)

(52) U.S. Cl.
CPC ............... *E02F 3/30* (2013.01); *B60L 11/1851* (2013.01); *E02F 9/2091* (2013.01); *E02F 9/26* (2013.01); *H01M 10/425* (2013.01); *H01M 10/482* (2013.01); *H02J 7/0016* (2013.01); *H02J 7/0021* (2013.01); *H01M 2010/4271* (2013.01); *H01M 2010/4278* (2013.01); *H01M 2220/20* (2013.01)

(58) Field of Classification Search
CPC ....... H02J 7/0021; E02F 9/2091; E02F 9/2246
USPC .......................................................... 320/118
See application file for complete search history.

(56) References Cited

U.S. PATENT DOCUMENTS

| | | | |
|---|---|---|---|
| 4,645,084 A * | 2/1987 | Deike ............................ | 212/271 |
| 6,199,307 B1 * | 3/2001 | Kagoshima et al. ............ | 37/443 |
| 6,991,050 B1 * | 1/2006 | Sanford et al. .................. | 180/13 |

(Continued)

FOREIGN PATENT DOCUMENTS

| | | |
|---|---|---|
| EP | 2075894 | 7/2009 |
| EP | 2216874 | 8/2010 |

(Continued)

OTHER PUBLICATIONS

Extended European Search Report dated Jun. 23, 2014.

*Primary Examiner* — Suchin Parihar
(74) *Attorney, Agent, or Firm* — IPUSA, PLLC

(57) ABSTRACT

A shovel includes a lower-part movable body, an upper-part turnable body turnably mounted on the lower-part movable body, a boom including a first end rotatably attached onto the upper-part turnable body, an arm including a first end rotatably attached to a second end of the boom, a work element rotatably attached to a second end of the arm, an electrical energy storage device including multiple electrical energy storage cells, and mounted on the upper-part turnable body, a controller configured to control the charge and discharge of the electrical energy storage device, and multiple voltage measurement parts configured to measure the respective cell voltages of the electrical energy storage cells. Information on the cell voltages is transmitted to the controller.

17 Claims, 7 Drawing Sheets

(51) Int. Cl.
*H01M 10/42* (2006.01)
*H01M 10/48* (2006.01)

(56) References Cited

U.S. PATENT DOCUMENTS

| | | | |
|---|---|---|---|
| 2004/0055185 A1* | 3/2004 | Onsager et al. | 37/307 |
| 2010/0079116 A1 | 4/2010 | Thivierge et al. | |
| 2010/0185405 A1* | 7/2010 | Aoshima et al. | 702/63 |
| 2010/0270095 A1* | 10/2010 | Shono et al. | 180/65.29 |
| 2011/0007480 A1* | 1/2011 | Souda | 361/728 |
| 2011/0092334 A1* | 4/2011 | Baino et al. | 477/5 |
| 2012/0004797 A1* | 1/2012 | Baino et al. | 701/22 |
| 2013/0141889 A1* | 6/2013 | Tsuchiya et al. | 361/821 |
| 2013/0317684 A1* | 11/2013 | Kaneko et al. | 701/22 |
| 2014/0171260 A1* | 6/2014 | Dalum | 477/5 |
| 2014/0199148 A1* | 7/2014 | Imura et al. | 414/687 |
| 2014/0332294 A1* | 11/2014 | Soma' et al. | 180/65.245 |
| 2015/0315766 A1* | 11/2015 | Take | 320/108 |

FOREIGN PATENT DOCUMENTS

| | | |
|---|---|---|
| JP | 2010004679 | 1/2010 |
| JP | 2011-030389 | 2/2011 |
| JP | 2012209467 | 10/2012 |
| JP | 2012210031 | 10/2012 |
| WO | 2013121916 | 8/2013 |
| WO | 2014057724 | 4/2014 |

* cited by examiner

SHOVEL AND METHOD OF CONTROLLING SHOVEL

CROSS-REFERENCE TO RELATED APPLICATION

This application is based upon and claims the benefit of priority of Japanese Patent Application No. 2013-023620, filed on Feb. 8, 2013, the entire contents of which are incorporated herein by reference.

BACKGROUND

1. Technical Field

The present invention generally relates to a shovel including an electrical energy storage device composed of multiple electrical energy storage cells and a method of controlling such a shovel.

2. Description of Related Art

Shovels according to related art include an electrical energy storage unit that includes multiple electric double-layer capacitors (cells) connected in series and equalizer circuits provided one for each of the cells.

The equalizer circuits according to related art each determine whether the voltage across a corresponding cell (cell voltage) is higher than or equal to an operating voltage by dividing the cell voltage using resistors and detecting a fraction of the cell voltage with a detecting element, and turn on a semiconductor switch to cause an electric current to leak through a bypass circuit when the cell voltage is higher than or equal to the operating voltage.

Thus, the equalizer circuits according to related art prevent the cell voltage of each cell from exceeding the operating voltage by individually discharging cells whose cell voltage is higher than or equal to the operating voltage, so as to maintain the cell voltage of each cell within a fixed range and to keep the cell voltages of the cells equal.

SUMMARY

According to an aspect of the present invention, a shovel includes a lower-part movable body, an upper-part turnable body turnably mounted on the lower-part movable body, a boom including a first end rotatably attached onto the upper-part turnable body, an arm including a first end rotatably attached to a second end of the boom, a work element rotatably attached to a second end of the arm, an electrical energy storage device including multiple electrical energy storage cells, and mounted on the upper-part turnable body, a controller configured to control the charge and discharge of the electrical energy storage device, and multiple voltage measurement parts configured to measure the respective cell voltages of the electrical energy storage cells. Information on the cell voltages is transmitted to the controller.

According to an aspect of the present invention, a method of controlling a shovel, which includes a lower-part movable body, an upper-part turnable body turnably mounted on the lower-part movable body, a boom including a first end rotatably attached onto the upper-part turnable body, an arm including a first end rotatably attached to a second end of the boom, a work element rotatably attached to a second end of the arm, an electrical energy storage device including multiple electrical energy storage cells, and mounted on the upper-part turnable body, a controller configured to control the charge and discharge of the electrical energy storage device, and multiple voltage measurement parts configured to measure the respective cell voltages of the electrical energy storage cells, includes transmitting information on the cell voltages to the controller.

It is to be understood that both the foregoing general description and the following detailed description are exemplary and explanatory and not restrictive of the invention.

DETAILED DESCRIPTION

The shovel according to the related art, however, does not monitor a difference, that is, a variation, in cell voltage between cells. Therefore, when the cell voltage of a cell becomes higher than or equal to the operating voltage, the cell is discharged although there are no variations in cell voltage among other cells. Such discharge is wasteful and is believed to increase the difference between the cell and other cells instead.

According to an aspect of the present invention, a shovel and a method of controlling a shovel are provided that are capable of monitoring variations in cell voltage among cells.

A description is given below, with reference to the accompanying drawings, of embodiments of the present invention.

Figure 1:
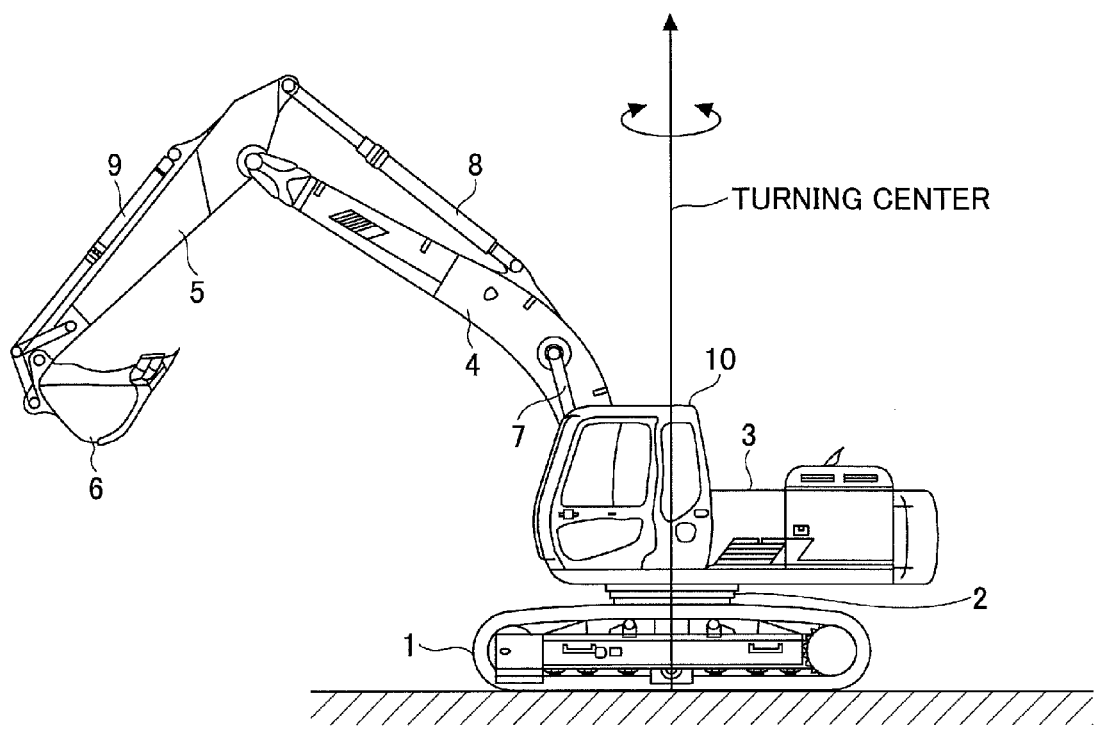
FIG. 1 is a side view of a hybrid shovel according to an embodiment.

FIG. 1 is a side view of a shovel according to an embodiment. The shovel illustrated in FIG. 1 is a hybrid shovel. Embodiments of the present invention, however, may be applied to not only hybrid shovels but also any kinds of shovels as long as the shovels include an electrical energy storage device as a power supply for driving an electrical load.

Referring to FIG. 1, an upper-part turning body 3 (an upper-part turnable body) is mounted through a turning mechanism 2 on a lower-part traveling body 1 (a lower-part movable body) of the hybrid shovel. A boom 4, an arm 5, a bucket 6, and a boom cylinder 7, an arm cylinder 8, and a bucket cylinder 9 for hydraulically driving the boom 4, the arm 5, and the bucket 6, respectively, are provided on the upper-part turning body 3. Furthermore, a cabin 10 and power sources are mounted on the upper-part turning body 3.

Figure 2:
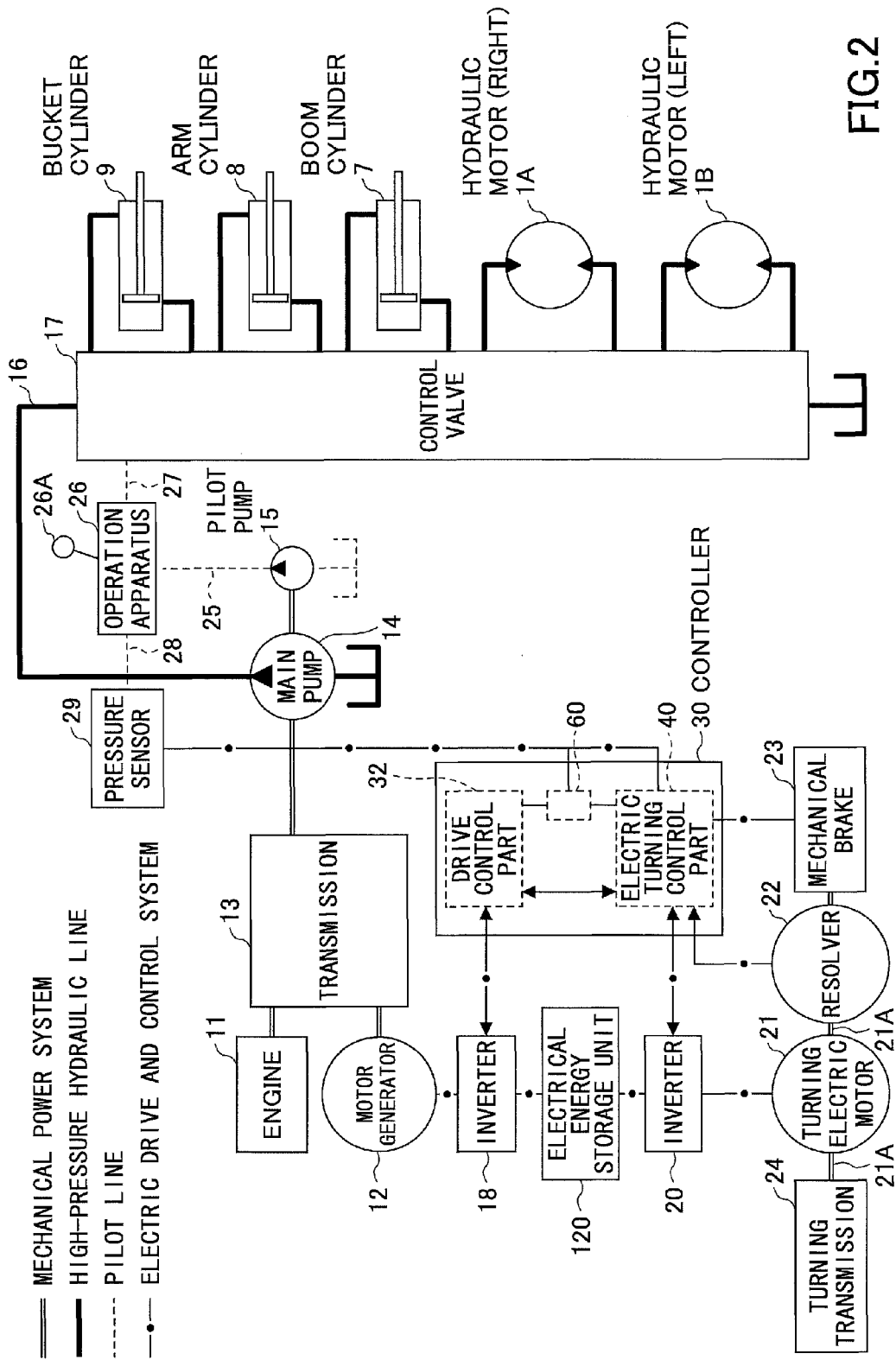
FIG. 2 is a block diagram illustrating a configuration of a drive system of the hybrid shovel illustrated in FIG. 1 according to an embodiment.

FIG. 2 is a block diagram illustrating a configuration of a drive system of a hybrid shovel according to an embodiment. In FIG. 2, a mechanical power system, a high-pressure hydraulic line, a pilot line, and an electric drive and control system are indicated by a double line, a solid line, a broken line, and a dot-dash line, respectively.

An engine 11 as a mechanical drive part and a motor generator 12 as an assist drive part are connected to a first input shaft and a second input shaft, respectively, of a transmission 13. A main pump 14 and a pilot pump 15 are connected to the output shaft of the transmission 13. A control valve 17 is connected to the main pump 14 via a high-pressure hydraulic line 16.

The control valve 17 is a control unit that controls a hydraulic system of the hybrid shovel. Hydraulic motors 1A (right) and 1B (left) for the lower-part traveling body 1, the boom cylinder 7, the arm cylinder 8, and the bucket cylinder 9 are connected to the control valve 17 via high-pressure hydraulic lines.

An electrical energy storage unit 120 including an electrical energy storage device, which is, for example, a capacitor or a battery for storing electrical energy, is connected to the motor generator 12 via an inverter 18. According to this embodiment, it is assumed that the electrical energy storage unit 120 includes a capacitor such as an electric double-layer capacitor (EDLC) as the electrical energy storage device. Furthermore, a turning electric motor 21 is connected to the electrical energy storage unit 120 via an inverter 20. A capacitor is illustrated above as an example of the electrical energy storage device. Alternatively, in place of the capacitor, a rechargeable battery, which is chargeable and dischargeable, such as a lithium-ion battery (LIB), or other form of power supply capable of transferring and receiving electric power may be used as the electrical energy storage device.

A resolver 22, a mechanical brake 23, and a turning transmission 24 are connected to a rotating shaft 21A of the turning electric motor 21. Furthermore, an operation apparatus 26 is connected to the pilot pump 15 via a pilot line 25.

The control valve 17 and a pressure sensor 29 as a lever operation detecting part are connected to the operation apparatus 26 via hydraulic lines 27 and 28, respectively. A controller 30 that controls the driving of an electric system is connected to the pressure sensor 29.

As described above, the inverter 18 is provided between the motor generator 12 and the electrical energy storage unit 120. The inverter 18 controls the operation of the motor generator 12 based on commands from the controller 30. This makes it possible for the inverter 18 to supply electric power from the electrical energy storage unit 120 to the motor generator 12 when the motor generator 12 performs a power running operation, and to store the electric power generated by the motor generator 12 in the electrical energy storage device of the electrical energy storage unit 120 when the motor generator 12 performs a regenerative operation.

The electrical energy storage unit 120 is provided between the inverter 18 and the inverter 20. This makes it possible for the electrical energy storage unit 120 to supply electric power for a power running operation when at least one of the motor generator 12 and the turning electric motor 21 performs a power running operation, and to store the electric power regenerated by a regenerative operation as electrical energy when at least one of the motor generator 12 and the turning electric motor 21 performs a regenerative operation.

As described above, the inverter 20 is provided between the turning electric motor 21 and the electrical energy storage unit 120. The inverter 20 controls the operation of the turning electric motor 21 based on commands from the controller 30. This makes it possible for the inverter 20 to supply electric power from the electrical energy storage unit 120 to the turning electric motor 21 when the turning electric motor 21 performs a power running operation, and to store the electric power generated by the turning electric motor 21 in the electrical energy storage device of the electrical energy storage unit 120 when the turning electric motor 21 performs a regenerative operation.

The charge and discharge of the electrical energy storage device of the electrical energy storage unit 120 is controlled by the controller 30 based on the state of charge of the electrical energy storage device, the operating state (power running operation or regenerative operation) of the motor generator 12, and the operating state (power running operation or regenerative operation) of the turning electric motor 21.

The controller 30 is a control unit that controls the driving of the shovel. The controller 30 includes a drive control part 32, an electric turning control part 40, and a main control part 60. The controller 30 includes a processor including a central processing unit (CPU) and an internal memory. The drive control part 32, the electric turning control part 40, and the main control part 60 are functional elements implemented by the CPU of the controller 30 executing a drive control program contained in the internal memory.

Furthermore, the controller 30 includes a processing part (not illustrated) that converts a signal input from the pressure sensor 29 into a speed command. As a result, the amount of operation of a lever 26A is converted into a speed command (rad/s) for causing the turning electric motor 21 to rotate. This speed command is input to the drive control part 32, the electric turning control part 40, and the main control part 60.

The drive control part 32 is a control unit for controlling the operation (switching the power running operation and the regenerative operation) of the motor generator 12 and for controlling the charge and discharge of the electrical energy storage device. The drive control part 32 switches the power running operation and the regenerative operation of the motor generator 12 in accordance with the state of a load on the engine 11 and the state of charge of the electrical energy storage device. The drive control part 32 controls the charge and discharge of the electrical energy storage device via the inverter 18 by switching the power running operation and the regenerative operation of the motor generator 12.

Figure 3:
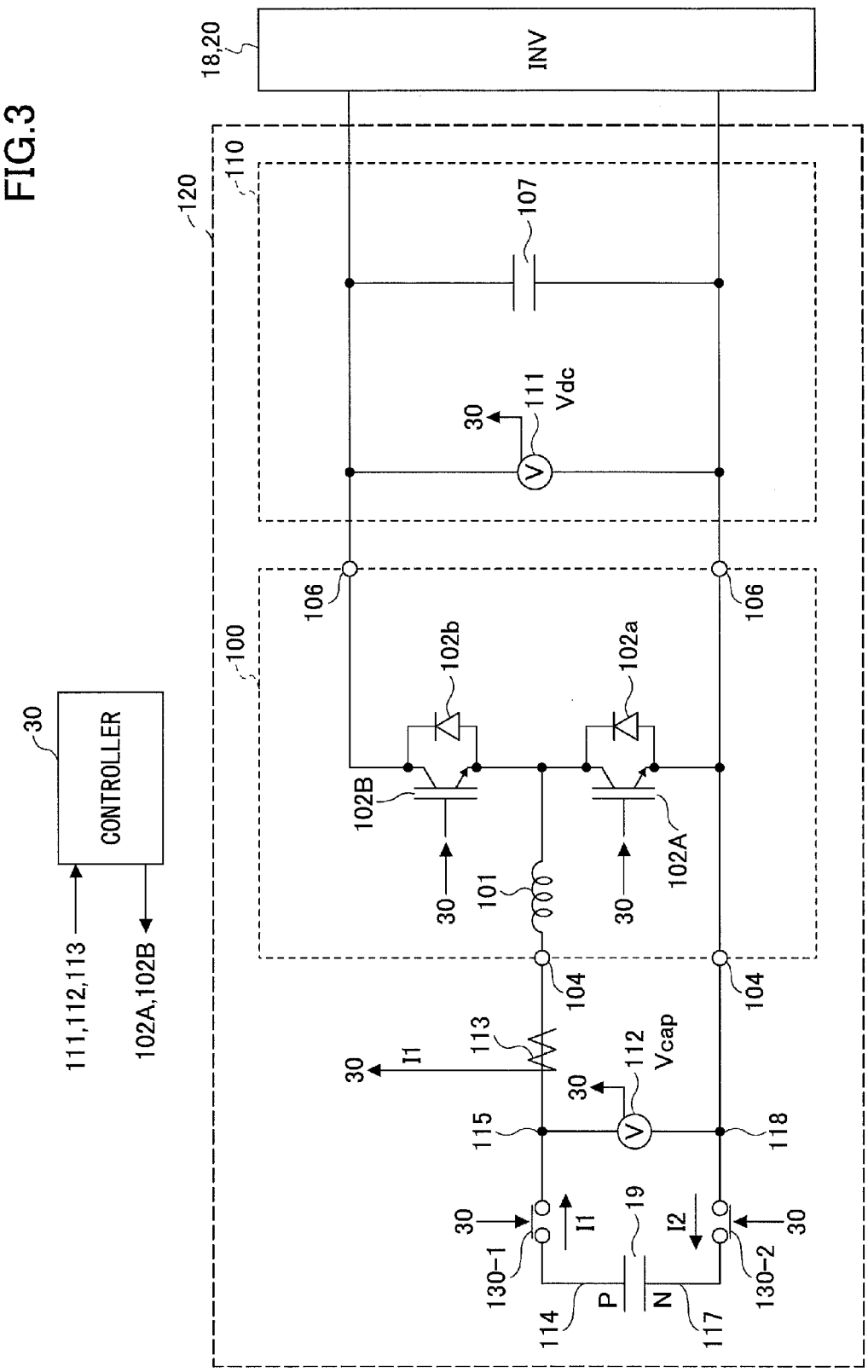
FIG. 3 is a circuit diagram of an electrical energy storage unit according to an embodiment.

FIG. 3 is a circuit diagram of the electrical energy storage unit 120 according to an embodiment. The electrical energy storage unit 120 includes a capacitor 19 as an electrical energy storage device, a step-up/step-down converter 100, and a DC bus 110. The DC bus 110 controls the transfer of electric power among the capacitor 19, the motor generator 12, and the turning electric motor 21. The capacitor 19 is provided with a capacitor voltage detecting part 112 for detecting a capacitor voltage value and a capacitor current detecting part 113 for detecting a capacitor current value. The capacitor voltage value detected by the capacitor voltage detecting part 112 and the capacitor current value detected by the capacitor current detecting part 113 are fed to the controller 30. The step-up/step-down converter 100 may perform control to keep the voltage of the DC bus 110 constant. In this case, by switching the power running operation and the regenerative operation of the motor generator 12, an electric current is caused to flow into or out of the DC bus 110 via the inverter 18, so that the electrical energy storage device is charged or discharged by the step-up/step-down converter 100.

The step-up/step-down converter 100 performs control to switch a step-up operation and a step-down operation in accordance with the operating states of the motor generator 12 and the turning electric motor 21, so that the DC bus voltage value falls within a certain range. The DC bus 110 is provided between the inverters 18 and 20 and the step-up/step-down converter 100 to transfer electric power among the capacitor 19, the motor generator 12, and the turning electric motor 21.

The switching of the step-up operation and the step-down operation of the step-up/step-down converter 100 is controlled based on the DC bus voltage value detected by a DC bus voltage detecting part 111, the capacitor voltage value detected by the capacitor voltage detecting part 112 and the capacitor current value detected by the capacitor current detecting part 113.

In the configuration as described above, the electric power generated by the motor generator 12, which is an assist motor, is supplied to the DC bus 110 of the electrical energy storage unit 120 via the inverter 18 to be supplied to the capacitor 19 via the step-up/step-down converter 100. The electric power regenerated by the regenerative operation of the turning electric motor 21 is supplied to the DC bus 110 of the electrical energy storage unit 120 via the inverter 20 to be supplied to the capacitor 19 via the step-up/step-down converter 100.

The step-up/step-down converter 100 includes a reactor 101, a step-up IGBT (Insulated Gate Bipolar Transistor) 102A, a step-down IGBT 102B, power supply connection terminals 104 for connecting the capacitor 19, and output terminals 106 for connecting the inverters 18 and 20. The output terminals 106 of the step-up/step-down converter 100 and the inverters 18 and 20 are connected by the DC bus 110.

The reactor 101 has one end connected to a point between the step-up IGBT 102A and the step-down IGBT 102B and has the other end connected to one of the power supply connection terminals 104. The reactor 101 is provided to supply the DC bus 110 with the induced electromotive power generated with the turning-on/off of the step-up IGBT 102A.

The step-up IGBT 102A and the step-down IGBT 102B, which are constituted of bipolar transistors each having a MOSFET (Metal Oxide Semiconductor Field Effect Transistor) incorporated into its gate part, are semiconductor devices (switching elements) capable of high-speed switching with high power. The step-up IGBT 102A and the step-down IGBT 102B are driven by application of PWM voltage to their gate terminals by the controller 30. Diodes 102a and 102b, which are rectifying elements, are connected in parallel to the step-up IGBT 102A and the step-down IGBT 102B, respectively.

The capacitor 19 may be a chargeable and dischargeable electrical energy storage device so as to enable transfer of electric power to and from the DC bus 110 via the step-up/step-down converter 100. In FIG. 3, the capacitor 19 is illustrated as an electrical energy storage device. Alternatively, in place of the capacitor 19, a rechargeable battery, which is chargeable and dischargeable, such as a lithium ion battery, or other form of power supply capable of transferring and receiving electric power may be used.

The power supply connection terminals 104 may be terminals to which the capacitor 19 may be connected, and the output terminals 106 may be terminals to which the inverters 18 and 20 may be connected. The capacitor voltage detecting part 112 that detects the capacitor voltage is connected between the paired power supply connection terminals 104. The DC bus voltage detecting part 111 that detects the DC bus voltage is connected between the paired output terminals 106.

The capacitor voltage detecting part 112 detects the voltage value Vcap of the capacitor 19. The DC bus voltage detecting part 111 detects the voltage value Vdc of the DC bus 110. A smoothing capacitor 107 is an electrical energy storage element inserted between the positive and the negative output terminal. 106 to smooth the DC bus voltage. The voltage of the DC bus 110 is maintained at a predetermined voltage by this smoothing capacitor 107.

The capacitor current detecting part 113 is a detecting part that detects the value of an electric current flowing through the capacitor 19 on the positive terminal (P terminal). side of the capacitor 19. That is, the capacitor current detecting part 113 detects the value of an electric current Ii that flows through the positive terminal of the capacitor 19.

In the step-up/step-down converter 100, at the time of raising the voltage of the DC bus 110, a PWM voltage is applied to the gate terminal of the step-up IGBT 102A, so that the induced electromotive force generated in the reactor 101 with the turning-on/off of the step-up IGBT 102A is supplied to the DC bus 110 via the diode 102b connected in parallel to the step-down IGBT 102B. As a result, the voltage of the DC bus 110 is raised.

At the time of lowering the voltage of the DC bus 110, a PWM voltage is applied to the gate terminal of the step-down IGBT 102B, so that regenerative electric power supplied via the inverter 18 or 20 is supplied from the IGBT bus 110 to the capacitor 19 via the step-down IGBT 102B. As a result, the capacitor 19 is charged with the electric power stored in the DC bus 110, so that the voltage of the DC bus 110 is lowered.

According to this embodiment, in a power supply line 114 that connects the positive terminal of the capacitor 19 to the one of the power supply connection terminals 104 of the step-up/step-down converter 100, a relay 130-1 is provided as a breaker capable of breaking the power supply line 114. The relay 130-1 is placed between a connecting point 115, where the capacitor voltage detecting part 112 is connected to the power supply line 114, and the positive terminal of the capacitor 19. The relay 130-1 is caused to operate by a signal from the controller 30, and is capable of disconnecting the capacitor 19 from the step-up/step-down converter 100 by breaking the power supply line 114 from the capacitor 19.

Furthermore, in a power supply line 117 that connects the negative terminal of the capacitor 19 to the other of the power supply connection terminals 104 of the step-up/step-down converter 100, a relay 130-2 is provided as a breaker capable of breaking the power supply line 117. The relay 130-2 is placed between a connecting point 118, where the capacitor voltage detecting part 112 is connected to the power supply line 117, and the negative terminal of the capacitor 19. The relay 130-2 is caused to operate by a signal from the controller 30, and is capable of disconnecting the capacitor 19 from the step-up/step-down converter 100 by breaking the power supply line 117 from the capacitor 19. The capacitor 19 may be disconnected by breaking both the power supply line 114 on the positive terminal side and the power supply line 117 on the negative terminal side simultaneously, forming the relay 130-1 and the relay 130-2 as a single relay.

In practice, there is a drive part that generates PWM signals to drive the step-up IGBT 102A and the step-down IGBT 102B between the controller 30 and the step-up IGBT 102A and the step-down IGBT 102B. In FIG. 3, however, the drive part is omitted. Such a drive part may be implemented by either an electronic circuit or a processor.

Figure 4:
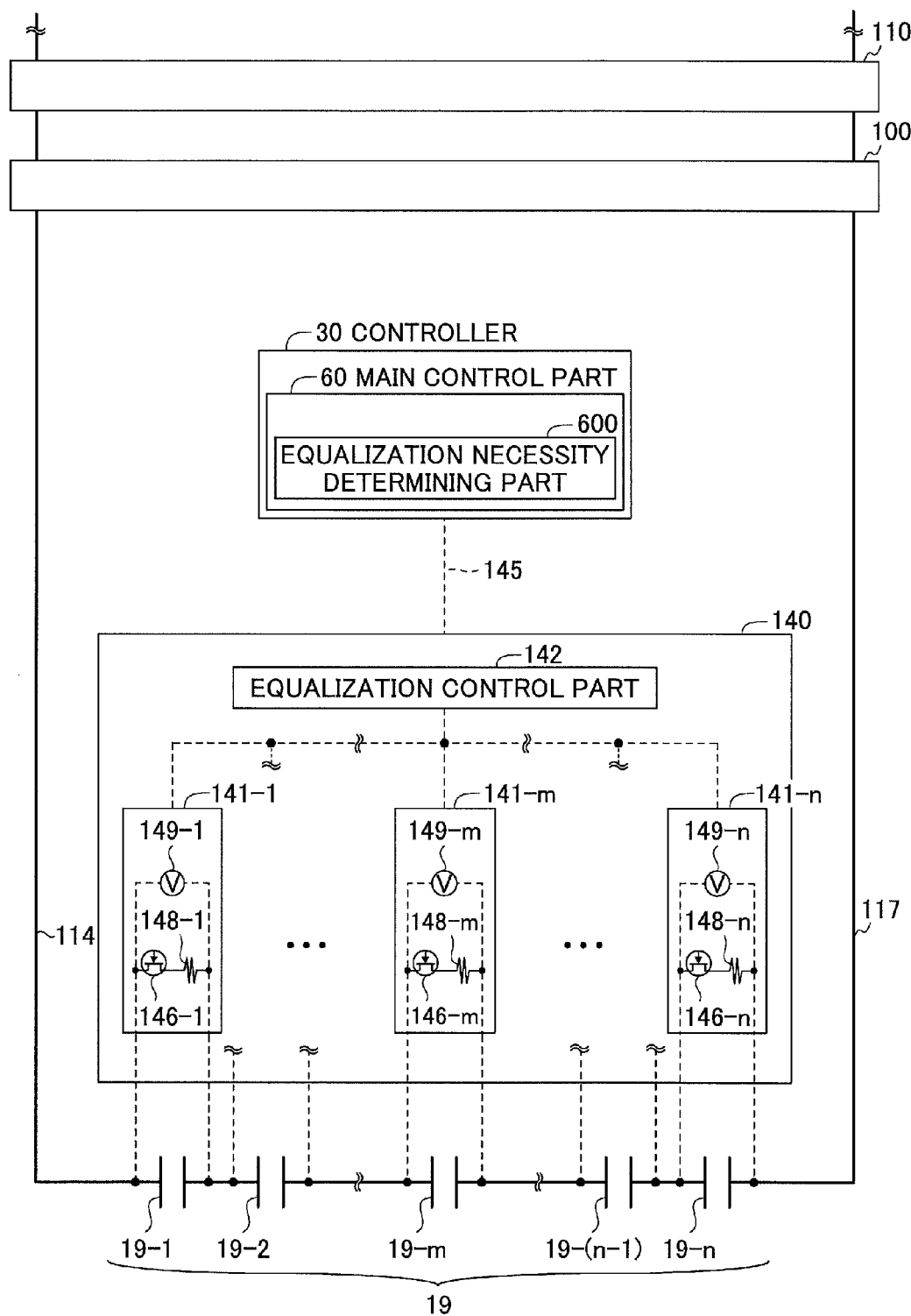
FIG. 4 is a schematic diagram illustrating a configuration of a capacitor according to an embodiment.

FIG. 4 is a schematic diagram illustrating a configuration of the capacitor 19 according to an embodiment. Referring to FIG. 4, the capacitor 19 as an electrical energy storage device includes n capacitor cells 19-1 through 19-$n$ ($n$ is an integer greater than or equal to two) as multiple electrical energy storage parts (hereinafter referred to as "electrical energy storage cells" or simply as "cells") and an electrical energy storage managing unit 140. In FIG. 4, an electric drive system is indicated by a solid line and an electric control system is indicated by a broken line.

The electrical energy storage managing unit 140, which is a device that manages the storage of electrical energy of the capacitor 19, includes equalizer circuit parts 141-1 through 141-$n$ and an equalization control part 142. According to this embodiment, the electrical energy storage managing unit 140 is supplied with electric power from the capacitor 19 to be constantly operable. Alternatively, the electrical energy storage managing unit 140 may be supplied with electric power from an external battery such as a 24 V battery. Furthermore, the electrical energy storage managing unit 140 is spaced apart from the controller 30 and is connected to the controller 30 via a communication line 145 compliant with a communication standard such as CAN. Alternatively, the electrical energy storage managing unit 140 and the controller 30 may be connected via radio communications.

The electrical energy storage managing unit 140 may be included in the electrical energy storage unit 120. Alternatively, the electrical energy storage managing unit 140 may be configured separately from the electrical energy storage unit 120 or part of the electrical energy storage managing unit 140 may be excluded from the electrical energy storage unit 120.

Furthermore, according to this embodiment, all of the n cells 19-1 through 19-$n$ are connected in series, and the single electrical energy storage managing unit 140 is provided for all the cells 19-1 through 19-$n$. Alternatively, cells connected in series may be arranged into a group, and one electrical energy storage managing unit may be provided for each of the groups connected in series or in parallel. Furthermore, a host electrical energy storage managing unit may be provided to control multiple electrical energy storage managing units.

In the following, for purposes of convenience, all the cells 19-1 through 19-$n$ may be collectively referred to as "cell 19-$n$" or each of the cells may be referred to by 19-$n$. The same applies to the equalizer circuit parts 141-1 through 141-$n$ and to below-described balancing switches 146-1 through 146-$n$, discharge resistors 148-1 through 148-$n$, and voltage measurement parts 149-1 through 149-$n$, which are the elements of the equalizer circuit parts 141-1 through 141-$n$.

The equalizer circuit parts 141-1 through 141-$n$ are electrical circuits that implement an equalization function. According to this embodiment, the equalizer circuit parts 141-1 through 141-$n$ execute the equalization function under the control of the equalization control part 142. The equalization function is a function to discharge one or more or all of the cells 19-1 through 19-$n$ in order to reduce variations in cell voltage among the cells 19-1 through 19-$n$.

Specifically, each equalizer circuit part 141-$n$ is connected across a corresponding one of the cells 19-$n$. For example, as illustrated in FIG. 4, the two electrodes of the specific cell. 19-$m$ (m is an integer greater than or equal to one and smaller than or equal to n) are connected to the equalizer circuit part 141-$m$. Furthermore, the equalizer circuit part 141-$m$ includes the balancing switch 146-$m$ and the discharge resistor 148-$m$. Furthermore, the equalizer circuit part 141-$m$ has the balancing switch 146-$m$ and the discharge resistor 148-$m$ connected in series between the two electrodes of the cell 19-$m$ and connected in parallel to the cell 19-$m$. Furthermore, the equalizer circuit part 141-$m$ includes the voltage measurement part 149-$m$ that measures the voltage across the cell 19-$m$. Furthermore, each equalizer circuit part 141-$n$ may be connected across one or more cell groups. The cell group refers to a group of multiple cells 19-$n$ connected in series.

The balancing switch 146-$n$ is a switch that controls the discharge of the cell 19-$n$ for equalization. The balancing switch 146-$n$ causes the cell 19-$n$ to discharge when the balancing switch 146-$n$ is in the ON (conducting) state and causes the cell 19-$n$ to stop discharging when the balancing switch 146-$n$ is in the OFF (non-conducting) state. According to this embodiment, the balancing switch 146-$n$ includes a field-effect transistor (FET). The balancing switch 146-$n$ switches between the ON (conducting) state and the OFF (non-conducting) state in accordance with a control signal from the equalization control part 142.

The equalization control part 142 is a device that controls the equalization function. According to this embodiment, the equalization control part 142 controls each of the equalizer circuit parts 141-1 through 141-$n$. Specifically, the equalization control part 142 obtains the cell voltage measurement values of the capacitor cells 19-1 through 19-$n$ individually from the equalizer circuit parts 141-1 through 141-$n$, respectively. The cell voltage measurement values of the capacitor cells 19-1 through 19-$n$ are individually measured by the voltage measurement parts 149-1 through 149-$n$, respectively. Furthermore, the equalization control part 142 controls the ON (conducting)/OFF (non-conducting) states of the balancing switches 146-1 through 146-$n$ individually by outputting control signals to the balancing switches 146-1 through 146-$n$.

More specifically, the equalization control part 142 connects to each of the equalizer circuit parts 141-1 through 141-$n$ through communications compliant with a communication standard such as CAN. Then, the equalization control part 142 obtains a cell voltage measurement value from each of the equalizer circuit parts 141-1 through 141-$n$ at predetermined intervals. Then, the equalization control part 142 calculates the statistics of one set of the obtained cell voltage measurement values, such as a maximum value, a minimum value, and an average, and outputs the calculated statistics to the controller 30. One set of cell voltage measurement values is composed of the respective latest cell voltage measurement values of the capacitor cells 19-1 through 19-$n$. Alternatively, the equalization control part 142 may output the obtained cell voltage measurement values directly to the controller 30.

Such information on multiple cell voltages is read into the controller 30 including an equalization necessity determining part 600 to be described below. The equalization necessity determining part 600 determines whether to perform equalization for reducing variations in cell voltage. The controller 30 is a control unit that controls the driving of the shovel, and includes the drive control part 32, the electric turning control part 40, and the main control part 60. As described above, the controller 30 may be provided separately from the electrical energy storage unit 120.

Accordingly, it is possible for the controller to determine whether to perform equalization on capacitor cells using the information on cell voltages, taking also into consideration the states of control of the drive control part 32, the electric turning control part 40, and the main control part 60 and information obtained from these control parts 32, 40, and 60. As described above, the information on cell voltages may be that processed in the electrical energy storage unit 120 or the very voltage values as measured. When determining to perform equalization, the controller 30 outputs an equalization start command to the equalization control part 142.

In response to the equalization start command (balancing start command) from the controller 30, the equalization control part 142 outputs an equalization start signal (balancing start signal) to the balancing switch 146-$n$ that corresponds to the capacitor cell 19-$n$ (of the capacitor cells 19-1 through 19-$n$) that satisfies a predetermined condition. For example, the equalization control part 142 outputs a balancing start signal to the balancing switch 146-$n$ corresponding to the capacitor cell 19-$n$ whose cell voltage is higher than a predetermined voltage V0. The predetermined voltage V0 may be either a preset voltage value or a statistic (for example, the average) of cell voltages calculated by, for example, the equalization control part 142.

The balancing switch 146-$n$ that has received the balancing start signal switches to the ON (conducting) state to cause the corresponding capacitor cell 19-$n$ to discharge irrespective of whether the capacitor 19 is being charged or discharged.

In this case, the specific cell 19-$n$ enters a conducting state, during which the overall voltage of the capacitor 19 decreases. Accordingly, the controller 30 may perform such control of the driving of the shovel (including control of the drive control part 32, the electric turning control part 40, and the main control part 60) as to restrict or suspend motor output and/or hydraulic pump output for at least a certain period based on information on the equalizing operation. Furthermore, the controller 30 may cancel this control based on the information on the equalizing operation when the equalizing operation ends. The equalization may be performed during the operation or work of the shovel.

Furthermore, the controller 30 is supplied with electric power to operate during key-on, and stops operating with the interruption of a supply of electric power during key-off. Therefore, the balancing switch 146-$n$ receives no balancing start signal during key-off. In the case of having received the balancing start signal before key-off, however, the balancing switch 146-$n$ continues to maintain the ON (conducting) state and perform the equalization (discharge) of the corresponding capacitor cell 19-$n$ after key-off. The "key-on" means a state where the shovel is in operation, which includes, for example, a state where the engine is in operation. The "key-off" means a state other than key-on, that is, a state where the operation of the shovel is stopped.

Furthermore, in response to an equalization stop command (balancing stop command) from the controller 30, the equalization control part 142 outputs an equalization stop signal (balancing stop signal) to each balancing switch 146-$n$ corresponding to the capacitor cell 19-$n$ that has been caused to start discharging. In this case, the balancing switch 146-$n$ that has received the balancing stop signal switches to the OFF (non-conducting) state to cause the corresponding capacitor cell 19-$n$ to stop discharging irrespective of the magnitude of the cell voltage of the corresponding capacitor cell 19-$n$.

Furthermore, when the cell voltage of the capacitor cell 19-$n$ caused to start discharging decreases to the predetermined voltage V0 during key-on, the equalization control part 142 outputs a balancing stop signal to the balancing switch 146-$n$ corresponding to the capacitor cell 19-$n$ irrespective of the presence or absence of a balancing stop command from the controller 30. The balancing switch 146-$n$ that has received the balancing stop signal switches to the OFF (non-conducting) state to cause the corresponding capacitor cell 19-$n$ to stop discharging. It is possible to cause discharge to be stopped without a balancing stop command from the controller 30. Therefore, it is possible to provide further protection for the capacitor cells 19-$n$, thus making it possible to keep the voltages of the capacitor cells 19-$n$ uniform.

Furthermore, during key-off, the equalization control part 142 may cause the capacitor cell 19-$n$ caused to start discharging to continue discharging until a variation in the respective cell voltages of the capacitor cells 19-1 through 19-$n$ becomes lower than a predetermined level. Specifically, the equalization control part 142 may cause the capacitor cell 19-$n$ caused to start discharging to continue discharging until a variation size, which is a difference between the maximum cell voltage and the minimum cell voltage of the respective cell voltages of the capacitor cells 19-1 through 19-$n$, becomes less than a predetermined voltage Vth. Compared with the case of simply causing discharge for equalization for a certain period, it is possible to ensure prevention of voltage variations among multiple cells.

Next, a description is given of the main control part 60 of the controller 30. The main control part 60 is a functional element that controls the movements of the shovel. The main control part 60 includes the equalization necessity determining part 600 as its subordinate functional element.

The equalization necessity determining part 600 is a functional element that determines the necessity or unnecessity of equalizing the cell voltages of multiple cells in the electrical energy storage device. According to this embodiment, the equalization necessity determining part 600 determines the necessity or unnecessity of equalizing the cell voltages of the capacitor cells 19-1 through 19-$n$ during key-on.

Specifically, the equalization necessity determining part 600 determines the necessity or unnecessity of the equalization of cell voltages (cell voltage equalization) based on information on the respective cell voltages of the capacitor cells 19-1 through 19-$n$ measured under the same condition. The equalization necessity determining part 600 obtains the information on cell voltages from the equalization control part 142 of the electrical energy storage managing unit 140. Furthermore, the information on cell voltages may include the respective cell voltage measurement values of the capacitor cells 19-1 through 19-$n$ and at least one of the maximum value, the minimum value, and the average of the cell voltage measurement values of one set, or may be information related to these voltages.

The expression "measured under the same condition" covers being measured without a factor that causes a large variation in cell voltage, for example, being measured in a state where the capacitor 19 is not being charged or discharged. The expression "measured under the same condition" allows the respective cell voltages of the capacitor cells 19-1 through 19-$n$ to be measured at different times. This is because, according to this embodiment, the equalization control part 142 obtains a cell voltage measurement value from one after another of the equalizer circuit parts 141-1 through 141-$n$ at predetermined intervals.

According to this embodiment, the equalization necessity determining part 600 uses information on cell voltages measured in a state where the capacitor 19 is not being charged or discharged. If "measured under the same condition," the equalization necessity determining part 600 may use information on cell voltages measured in a state where the capacitor 19 is being slightly charged or discharged, such as a state where the amount of charge or discharge is limited. Furthermore, the equalization necessity determining part 600 may use the state of a gate lever for preventing a malfunction of the shovel in order to determine the state where the capacitor 19 is not being charged or discharged. Specifically, the equalization necessity determining part 600 may determine that the capacitor 19 is not being charged or discharged when the gate lever is in the OFF state. The OFF state of the gate lever is a state where the gate lever is lowered, in which state the operations of various kinds of operation levers are nullified. Furthermore, in the OFF state of the gate lever, the equalization necessity determining part 600 may prevent variations in the voltage of the DC bus 110 from affecting the voltage of the capacitor 19 by causing control of the step-up/step-down converter 100 to be stopped.

Then, the equalization necessity determining part 600 determines the necessity or unnecessity of cell voltage equalization based on the size of a variation in the respective latest cell voltage measurement values of the capacitor cells 19-1 through 19-$n$. Specifically, the equalization necessity determining part 600 determines that there is a great variation in the cell voltage measurement values and it is necessary to perform cell voltage equalization when the variation size, which is a difference between the maximum cell voltage and the minimum cell voltage of the respective latest cell voltage measurement values of the capacitor cells 19-1 through 19-n, is greater than or equal to a predetermined voltage V1, for example.

Then, in the case of determining that the cell voltage equalization is necessary, the equalization necessity determining part 600 outputs a balancing start command to the equalization control part 142 of the electrical energy storage managing unit 140. On the other hand, in the case of determining that the cell voltage equalization is unnecessary, the equalization necessity determining part 600 outputs a balancing stop command to the equalization control part 142 of the electrical energy storage managing unit 140. Instead of alternatively outputting a balancing start command or a balancing stop command in accordance with the result of determination as to the necessity or unnecessity of the cell voltage equalization, the equalization necessity determining part 600 may output a balancing start command or a balancing stop command in a different procedure. For example, in the case of having already output a balancing start command, the equalization necessity determining part 600 may output a balancing stop command when the variation size becomes smaller than a predetermined voltage V2 (<V1).

Because the controller 30 performs determination as to equalization control based on information on multiple cell voltages, it is possible to directly control a difference in voltage value between multiple cells.

In response to reception of the balancing start command, the equalization control part 142 outputs a balancing start signal to the balancing switch 146-n corresponding to the capacitor cell 19-n (of the capacitor cells 19-1 through 19-n) that satisfies a predetermined condition as described above. Furthermore, in response to reception of the balancing stop command, the equalization control part 142 outputs a balancing stop signal to the balancing switch 146-n corresponding to the capacitor cell 19-n that has been caused to start discharging. In response to reception of the balancing stop command, the equalization control part 142 may alternatively output a balancing stop signal to each of the capacitor cells 19-1 through 19-n.

Figure 5:
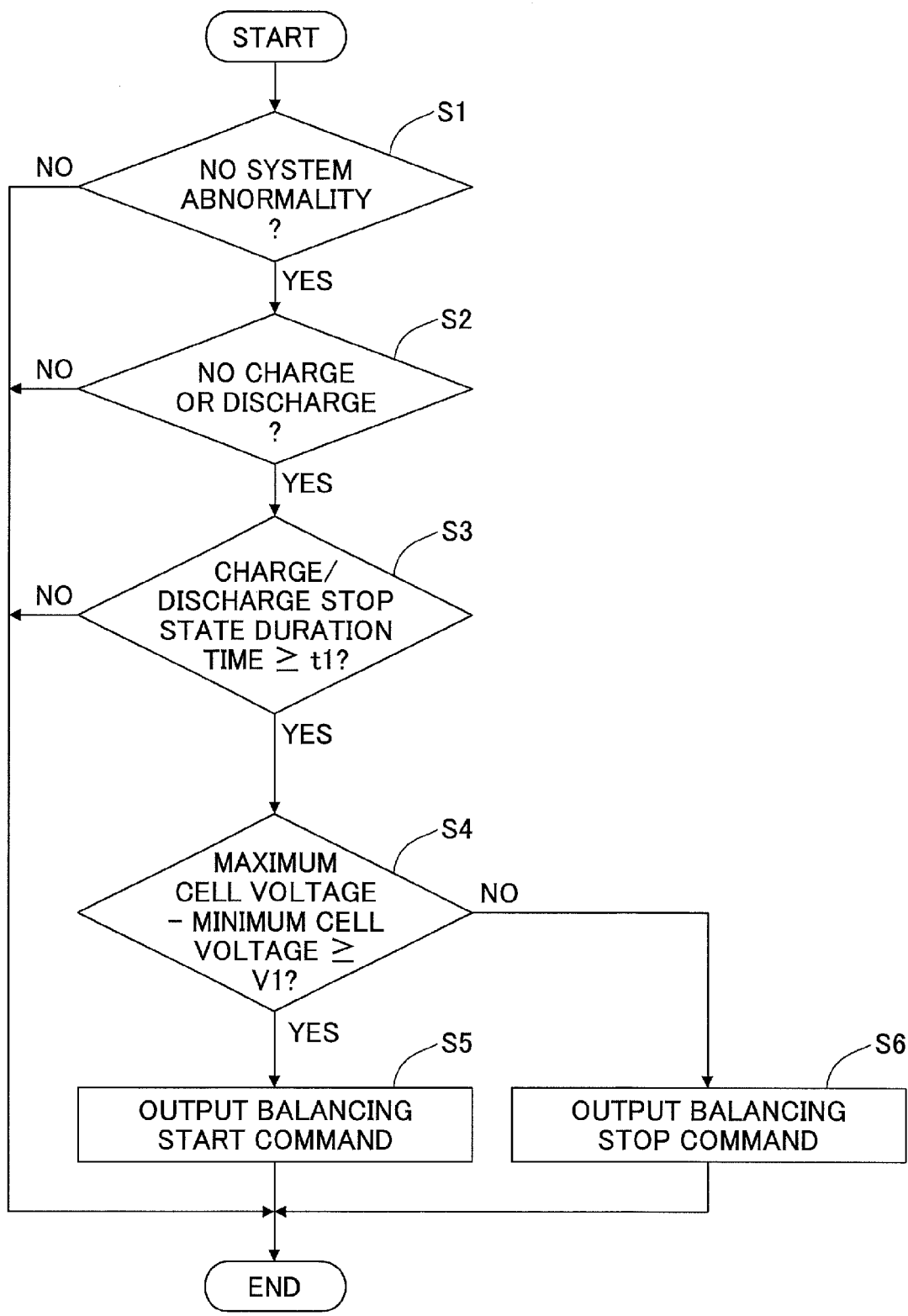
FIG. 5 is a flowchart illustrating a flow of an equalization necessity determining process according to an embodiment.

Next, a description is given, with reference to FIG. 5, of a process for the controller 30 determining the necessity or unnecessity of equalizing the respective cell voltages of the capacitor cells 19-1 through 19-n during key-on (hereinafter referred to as "equalization necessity determining process"). FIG. 5 is a flowchart illustrating a flow of the equalization necessity determining process according to an embodiment. The controller 30 repeatedly executes this equalization necessity determining process at predetermined intervals.

First, at step S1, the equalization necessity determining part 600 in the main control part 60 of the controller 30 determines the presence or absence of a system abnormality. Specifically, the equalization necessity determining part 600 determines the presence or absence of an abnormality in communications between the controller 30 and the electrical energy storage managing unit 140, an abnormality in communications between the equalization control part 142 and each of the equalizer circuit parts 141-1 through 141-n, and an abnormality in voltage measurement in each of the voltage measurement parts 149-1 through 149-n.

In the case of determining that there is no system abnormality (YES at step S1), at step S2, the equalization necessity determining part 600 determines whether or not the capacitor 19 is being charged or discharged.

On the other hand, in the case of determining that there is a system abnormality (NO at step S1), or in the case of determining that the capacitor 19 is being charged or discharged (NO at step S2), the equalization necessity determining part 600 ends the equalization necessity determining process of this time.

In the case of determining that the capacitor 19 is not being charged or discharged (YES at step S2), at step S3, the equalization necessity determining part 600 monitors duration for which the state of no charge or discharge continues (hereinafter referred to as "charge/discharge stop state duration time").

If the charge/discharge stop state duration time is less than a predetermined time t1 (NO at step S3), the equalization necessity determining part 600 ends the equalization necessity determining process of this time. On the other hand, if the charge/discharge stop state duration time becomes more than or equal to the predetermined time t1 (NO at step S3), at step 34, the equalization necessity determining part 600 determines the necessity or unnecessity of cell voltage equalization based on the size of a variation in the respective cell voltages of the capacitor cells 19-1 through 19-n. Specifically, the equalization necessity determining part 600 determines the size of a variation in the cell voltages based on the respective latest cell voltage measurement values of the capacitor cells 19-1 through 19-n measured during the absence of charge or discharge. This is because it is possible to determine that the respective cell voltages of the capacitor cells 19-1 through 19-n have been measured under the same condition and that it is possible to determine the size of a variation with accuracy. Then, according to this embodiment, the equalization necessity determining part 600 determines whether the variation size, which is a difference between the maximum cell voltage and the minimum cell voltage of the cell voltage measurement values of the latest set, is greater than or equal to the predetermined voltage V1.

Because the necessity or unnecessity of equalization is determined based on the voltage information at a time when neither charge nor discharge is being performed, it is possible to perform determination with high accuracy.

In the case of determining that the variation size is greater than or equal to the predetermined voltage V1 (YES at step S4), at step S5, the equalization necessity determining part 600 determines that the cell voltage equalization is necessary, and outputs a balancing start command to the equalization control part 142 of the electrical energy storage managing unit 140.

On the other hand, in the case of determining that the variation size is smaller than the predetermined voltage V1 (NO at step S4), at step S6, the equalization necessity determining part 600 determines that the cell voltage equalization is unnecessary, and outputs a balancing stop command to the equalization control part 142. The equalization necessity determining part 600 may also be configured to output a balancing stop command in the case of determining that the variation size is smaller than the predetermined voltage V2 (<V1), so that the cell voltage equalization may be continued until the variation size becomes smaller than the predetermined voltage V2 (<V1).

Furthermore, the equalization necessity determining part 600 resets the charge/discharge stop state duration time every time the necessity or unnecessity of the cell voltage equalization is determined, and repeats determination as to the necessity or unnecessity of the cell voltage equalization every time the charge/discharge stop state duration time becomes more than or equal to the predetermined time t1. Alternatively, the equalization necessity determining part 600 may be configured to perform no other determination as to the necessity or unnecessity of the cell voltage equalization before the passage of a predetermined time t2 (>t1) after once performing the necessity/unnecessity determination. Furthermore, a condition for the equalization necessity determining part 600 performing another necessity/unnecessity determination may be determined as desired. For example, the equalization necessity determining part 600 may be configured to perform no other necessity/unnecessity determination before another key-on after key-off, after once performing determination as to the necessity or unnecessity of the cell voltage equalization.

Figure 6:
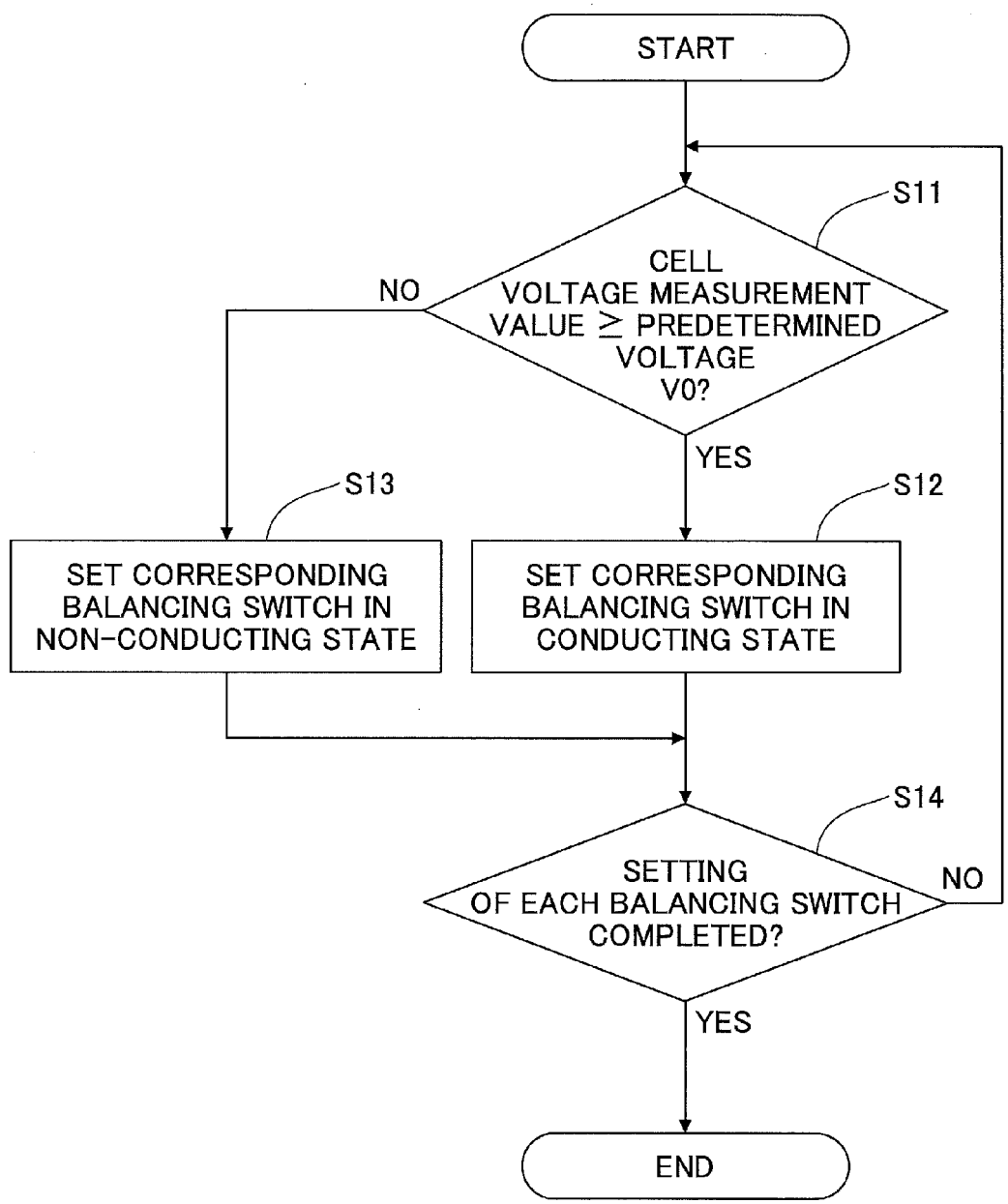
FIG. 6 is a flowchart illustrating a flow of a key-on time equalization process according to an embodiment.

Next, a description is given, with reference to FIG. 6, of a process for the equalization control part 142 controlling the balancing switches 146-1 through 146-n corresponding to the capacitor cells 19-1 through 19-n, respectively, during key-on (hereinafter referred to as "key-on time equalization process"). FIG. 6 is a flowchart illustrating a flow of the key-on time equalization process according to an embodiment. During key-on, the equalization control part 142 repeatedly executes this key-on time equalization process at predetermined intervals after receiving a balancing start command from the controller 30.

First, at step S11, the equalization control part 142 determines whether the cell voltage measurement value is higher than or equal to the predetermined voltage V0 based on the output of the voltage measurement part 149-n corresponding to the capacitor cell 19-n.

In the case of determining that the cell voltage measurement value is higher than or equal to the predetermined voltage V0 (YES at step S1), at step S12, the equalization control part 142 outputs a balancing start signal to the balancing switch 146-n corresponding to the capacitor cell 19-n, and sets the balancing switch 146-n in the ON (conducting) state.

On the other hand, in the case of determining that the cell voltage measurement value is lower than the predetermined voltage V0 (NO at step S11), at step S13, the equalization control part 142 outputs a balancing stop signal to the balancing switch 146-n corresponding to the capacitor cell 19-n, and sets the balancing switch 146-n in the OFF (non-conducting) state.

Thereafter, at step S14, the equalization control part 142 determines whether the setting of the ON (conducting)/OFF (non-conducting) state of each balancing switch 146-n is completed.

Then, in the case of determining that the setting of each balancing switch 146-n is not completed (NO at step 314), the equalization control part 142 repeats the process of step S11 through step S14 until the setting of each balancing switch 146-n is completed.

In the case of determining that the setting of each balancing switch 146-n is completed (YES at step S14), the equalization control part 142 ends the key-on time equalization process of this time.

In the case of receiving a balancing stop command from the controller 30 during the execution of the key-on time equalization process, the equalization control part 142 sets each balancing switch 146-n in the OFF (non-conducting) state and stops repeating the key-on time equalization process.

The equalization necessity determining part 600 may be included in the main control part 60, and the controller 30 includes the main control part 60. Accordingly, because the controller 30 may include the equalization necessity determining part 600 and other control parts, it is also possible to suitably output a balancing stop command based on the operations of work elements, the operations of operation levers, and information on the driving of a drive part.

Figure 7:
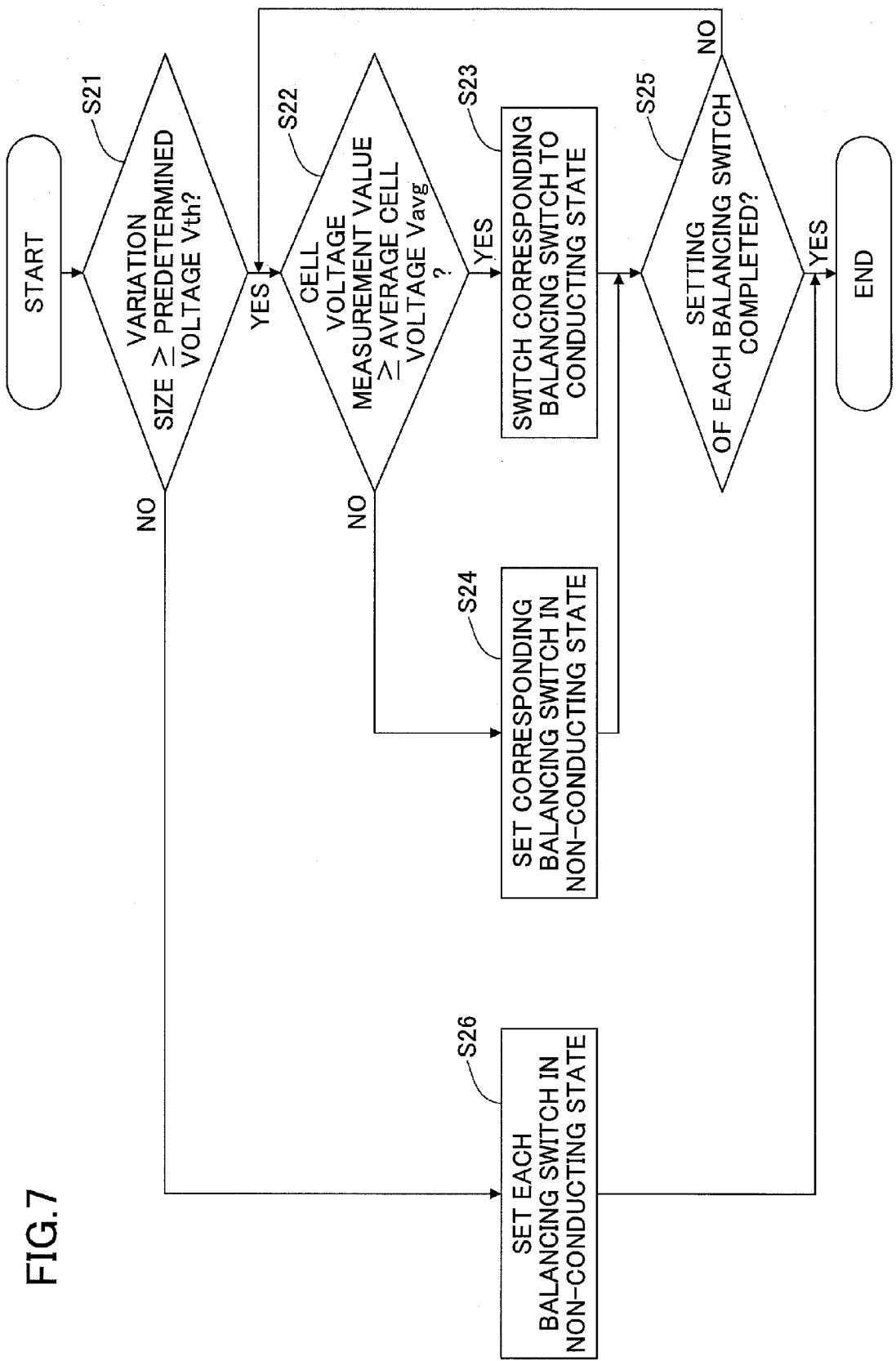
FIG. 7 is a flowchart illustrating a flow of a key-off time equalization process according to an embodiment.

Next, a description is given, with reference to FIG. 7, of a process for the equalization control part 142 controlling the balancing switches 146-1 through 146-n corresponding to the capacitor cells 19-1 through 19-n, respectively, during key-off (hereinafter referred to as "key-off time equalization process"). FIG. 7 is a flowchart illustrating a flow of the key-off time equalization process according to an embodiment. The equalization control part 142 repeatedly executes this key-off time equalization process at predetermined intervals during key-off after receiving a balancing start command from the controller during key-on.

First, at step S21, the equalization control part 142 calculates the variation size, which is a difference between the maximum cell voltage and the minimum cell voltage of the respective cell voltages of the capacitor cells 19-1 through 19-n, and an average cell voltage Vavg based on the respective outputs of the voltage measurement parts 149-1 through 149-n. Then, the equalization control part 142 determines whether the calculated variation size is greater than or equal to the predetermined voltage Vth.

In the case of determining that the variation size is greater than or equal to the predetermined voltage Vth (YES at step S21), at step S22, the equalization control part 142 determines whether the cell voltage measurement value is higher than or equal to the average cell voltage Vavg based on the output of the voltage measurement part 149-n corresponding to the capacitor cell 19-n.

In the case of determining that the cell voltage measurement value is higher than or equal to the average cell voltage Vavg (YES at step S22), at step S23, the equalization control part 142 outputs a balancing start signal to the balancing switch 146-n corresponding to the capacitor cell 19-n, and sets the balancing switch 146-n in the ON (conducting) state.

On the other hand, in the case of determining that the cell voltage measurement value is lower than the average cell voltage Vavg (NO at step S22), at step S24, the equalization control part 142 outputs a balancing stop signal to the balancing switch 146-n corresponding to the capacitor cell 19-n, and sets the balancing switch 146-n in the OFF (non-conducting) state.

Thereafter, at step S25, the equalization control part 142 determines whether the setting of the ON (conducting)/OFF (non-conducting) state of each balancing switch 146-n is completed.

Then, in the case of determining that the setting of each balancing switch 146-n is not completed (NO at step S25), the equalization control part 142 repeats the process of step S22 through step S25 until the setting of each balancing switch 146-n is completed.

In the case of determining that the setting of each balancing switch 146-n is completed (YES at step S25), the equalization control part 142 ends the key-off time equalization process of this time. The controller 30 may reflect the information that the process has ended in other control parts and drive the shovel.

On the other hand, in the case of determining that the variation size is smaller than the predetermined voltage Vth (NO at step S21), at step S26, the equalization control part 142 sets each balancing switch 146-n in the OFF (non-conducting) state and stops repeating the key-off time equalization process. The controller 30 may reflect the information that the process has been stopped in other control parts and drive the shovel.

According to the above-described configuration, it is possible for the controller 30 connected to the electrical energy storage managing unit 140 to determine the presence or absence of the charge or discharge of the capacitor 19 during key-on and the respective cell voltages of the capacitor cells 19-1 through 19-n measured in the absence of the charge or discharge of the capacitor 19. As a result, it is possible for the controller 30 to determine the necessity or unnecessity to equalize cell voltages based on the size of a variation in the cell voltages, so that it is possible to avoid needlessly causing the cell voltage equalization (discharge) to start in spite of a limited variation in the cell voltages.

Furthermore, in the case of determining that the cell voltage equalization is necessary based on the size of a variation in cell voltages, the controller 30 executes cell voltage equalization whether during key-off or during key-on. Therefore, it is possible for the controller 30 to continue the cell voltage equalization during key-on even when the cell voltage equalization is not sufficiently performed during key-off.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

For example, the controller 30 may create a state where the capacitor 19 is not being charged or discharged by stopping controlling the step-up/step-down converter 100 when the gate lever is lowered.

Furthermore, also in a configuration without the step-up/step-down converter 100, that is, a configuration where the capacitor 19 and the inverters 18 and 20 are directly connected, the controller 30 may determine the necessity or unnecessity of cell voltage equalization based on information on the respective cell voltages of the capacitor cells 19-1 through 19-n. Specifically, the controller 30 may determine the necessity or unnecessity of cell voltage equalization based on information on cell voltages measured in a state where the capacitor 19 is not being charged or discharged or in a state where the capacitor 19 is so slightly charged or discharged that it is possible to allow the respective cell voltages of the capacitor cells 19-1 through 19-n measured at different times to serve as cell voltages "measured under the same condition." More specifically, when either of the above-described states continues for a period longer than or equal to the predetermined time t1, the controller 30 may determine the necessity or unnecessity of cell voltage equalization based on the size of a variation in the respective latest cell voltages of the capacitor cells 19-1 through 19-n measured during that period.

What is claimed is:

1. A shovel, comprising:
   a lower-part movable body;
   an upper-part turnable body turnably mounted on the lower-part movable body;
   a boom including a first end rotatably attached onto the upper-part turnable body;
   an arm including a first end rotatably attached to a second end of the boom;
   a work element rotatably attached to a second end of the arm;
   an electrical energy storage device including a plurality of electrical energy storage cells, and mounted on the upper-part turnable body;
   a controller configured to control a charge and a discharge of the electrical energy storage device; and
   a plurality of voltage measurement parts configured to measure respective cell voltages of the plurality of electrical energy storage cells,
   wherein information on the cell voltages is transmitted to the controller, and
   wherein the controller is configured to determine whether to equalize the cell voltages of the plurality of electrical energy storage cells based on the cell voltages measured under a same condition during a key-on state.

2. The shovel as claimed in claim 1, wherein the controller is configured to discharge an electrical energy storage cell whose cell voltage is higher than or equal to a predetermined voltage among the plurality of electrical energy storage cells, in a case of determining to equalize the cell voltages.

3. The shovel as claimed in claim 1, wherein the controller is configured to discharge an electrical energy storage cell whose cell voltage is higher than or equal to a predetermined voltage among the plurality of electrical energy storage cells when the charge or the discharge of the electrical energy storage device is being performed, in a case of determining to equalize the cell voltages.

4. The shovel as claimed in claim 1, wherein the controller is configured to discharge an electrical energy storage cell whose cell voltage is higher than or equal to a predetermined voltage among the plurality of electrical energy storage cells when the charge or the discharge of the electrical energy storage device is not being performed, in a case of determining to equalize the cell voltages.

5. The shovel as claimed in claim 1, further comprising:
   an electrical energy storage unit,
   the electrical energy storage unit including
      the electrical energy storage device; and
      an equalization control part configured to obtain the information on the cell voltages from the plurality of voltage measurement parts and output the obtained information to the controller.

6. The shovel as claimed in claim 5, wherein the equalization control part is provided for each of groups of the plurality of electrical energy storage cells, wherein the electrical energy storage cells are connected in series in each of the groups.

7. The shovel as claimed in claim 1, wherein the plurality of voltage measurement parts is provided inside an electrical energy storage unit including the electrical energy storage device, and
   the controller is a drive unit configured to control driving of the shovel and is provided separately from the electrical energy storage unit.

8. The shovel as claimed in claim 1, wherein the controller is configured to control driving of the shovel based on information on an operation of equalizing the cell voltages.

9. A method of controlling the shovel as claimed in claim 1, the method comprising:
   reading, by the controller, the information on the cell voltages.

10. The method as claimed in claim 9, further comprising:
    measuring, by the plurality of voltage measurement parts, the cell voltages of the plurality of electrical energy storage cells under the same condition during the key-on state; and
    determining, by the controller, whether to equalize the cell voltages based on the measured cell voltages.

11. The method as claimed in claim 9, further comprising:
    determining, by the controller, whether an absence of the charge and the discharge of the electrical energy storage device continues for a predetermined time during the key-on state;

determining, by the controller, a presence or an absence of a variation in the cell voltages of the plurality of electrical energy storage cells measured during the predetermined time in response to determining the continuation of the absence of the charge and the discharge of the electrical energy storage device; and equalizing, by the controller, the cell voltages in response to determining the presence of the variation in the cell voltages.

12. The method as claimed in claim 9, further comprising:

obtaining the information on the cell voltages from the plurality of voltage measurement parts by an equalization control part provided in an electric energy storage unit including the electrical energy storage device, wherein the obtained information is output to the controller by the equalization control part.

13. A shovel, comprising:

a lower-part movable body;

an upper-part turnable body turnably mounted on the lower-part movable body;

a boom including a first end rotatably attached onto the upper-part turnable body;

an arm including a first end rotatably attached to a second end of the boom;

a work element rotatably attached to a second end of the arm;

an electrical energy storage device including a plurality of electrical energy storage cells, and mounted on the upper-part turnable body;

a controller configured to control a charge and a discharge of the electrical energy storage device; and a plurality of voltage measurement parts configured to measure respective cell voltages of the plurality of electrical energy storage cells, wherein information on the cell voltages is transmitted to the controller, and wherein the controller is configured to determine to equalize the cell voltages in response to determining a presence of a variation in the cell voltages of the plurality of electrical energy storage cells measured during a predetermined time, in a case of determining an absence of the charge and the discharge of the electrical energy storage device for the predetermined time during a key-on state.

14. The shovel as claimed in claim 13, wherein the controller is configured to discharge an electrical energy storage cell whose cell voltage is higher than or equal to a predetermined voltage among the plurality of electrical energy storage cells, in a case of determining to equalize the cell voltages.

15. The shovel as claimed in claim 13, wherein the controller is configured to discharge an electrical energy storage cell whose cell voltage is higher than or equal to a predetermined voltage among the plurality of electrical energy storage cells when the charge or the discharge of the electrical energy storage device is being performed, in a case of determining to equalize the cell voltages.

16. The shovel as claimed in claim 13, wherein the controller is configured to discharge an electrical energy storage cell whose cell voltage is higher than or equal to a predetermined voltage among the plurality of electrical energy storage cells when the charge or the discharge of the electrical energy storage device is not being performed, in a case of determining to equalize the cell voltages.

17. A shovel, comprising:

a lower-part movable body;

an upper-part turnable body turnably mounted on the lower-part movable body;

a boom including a first end rotatably attached onto the upper-part turnable body;

an arm including a first end rotatably attached to a second end of the boom;

a work element rotatably attached to a second end of the arm;

an electrical energy storage device including a plurality of electrical energy storage cells, and mounted on the upper-part turnable body;

a controller configured to control a charge and a discharge of the electrical energy storage device; and a plurality of voltage measurement parts configured to measure respective cell voltages of the plurality of electrical energy storage cells, wherein information on the cell voltages is transmitted to the controller, and wherein the controller is configured to determine whether to equalize the cell voltages of the plurality of electrical energy storage cells based on the cell voltages measured during a predetermined time every time the controller determines an absence of the charge and the discharge of the electrical energy storage device for the predetermined time during a key-on state.

* * * * *